US011199656B2

(12) United States Patent
Nasilowski et al.

(10) Patent No.: US 11,199,656 B2
(45) Date of Patent: Dec. 14, 2021

(54) MICROSTRUCTURED MULTICORE OPTICAL FIBRE (MMOF), A DEVICE AND THE FABRICATION METHOD OF A DEVICE FOR INDEPENDENT ADDRESSING OF THE CORES OF MICROSTRUCTURED MULTICORE OPTICAL FIBRE

(71) Applicant: Inphotech sp. z o. o., Warsaw (PL)

(72) Inventors: Tomasz Nasilowski, Warsaw (PL);
Zbigniew Holdynski, Zytkiejmy (PL);
Lukasz Szostkiewicz, Torun (PL);
Katarzyna Pawlik, Warsaw (PL);
Marek Napierala, Warsaw (PL);
Tadeusz Tenderenda, Warsaw (PL);
Michal Murawski, Warsaw (PL);
Michal Szymanski, Warsaw (PL);
Lukasz Ostrowski, Nieporet (PL);
Mateusz Slowikowski, Warsaw (PL);
Anna Katarzyna Ziolowicz, Kielce (PL); Karol Stepien, Warsaw (PL)

(73) Assignee: Inphotech sp. z o.o., Warsaw (PL)

( * ) Notice: Subject to any disclaimer, the term of this patent is extended or adjusted under 35 U.S.C. 154(b) by 0 days.

(21) Appl. No.: 15/104,918

(22) PCT Filed: Dec. 15, 2014

(86) PCT No.: PCT/PL2014/050077
§ 371 (c)(1),
(2) Date: Jun. 15, 2016

(87) PCT Pub. No.: WO2015/088365
PCT Pub. Date: Jun. 18, 2015

(65) Prior Publication Data
US 2016/0320556 A1 Nov. 3, 2016

(30) Foreign Application Priority Data
Dec. 15, 2013 (PL) .......................... 406499

(51) Int. Cl.
*G02B 6/02* (2006.01)
*C03C 25/68* (2006.01)
*H01S 3/16* (2006.01)

(52) U.S. Cl.
CPC .......... *G02B 6/02042* (2013.01); *C03C 25/68* (2013.01); *G02B 6/02338* (2013.01);
(Continued)

(58) Field of Classification Search
CPC ............ G02B 6/02042; G02B 6/02338; G02B 6/02357; G02B 6/02366; C03C 25/68; H01S 3/1608
(Continued)

(56) References Cited

U.S. PATENT DOCUMENTS

| | | | | |
|---|---|---|---|---|
| 6,539,155 B1 * | 3/2003 | Broeng | ............ | B29D 11/00721 385/125 |
| 2005/0185908 A1 * | 8/2005 | Roberts | ............. | C03B 37/02781 385/125 |

(Continued)

FOREIGN PATENT DOCUMENTS

JP 2011180243 A * 9/2011 ............... G02B 6/04

*Primary Examiner* — Jerry M Blevins
(74) *Attorney, Agent, or Firm* — The Concept Law Group, PA; Scott D. Smiley; Scott M. Garrett

(57) ABSTRACT

Microstructured multicore optical fibre with a microstructure area, in which, at least two basic cells are embedded, where each of them contains a core, preferably made of glass, specifically including doped silica glass or polymer, together with the surrounding it longitudinal areas with lower refraction index vs. that of the cladding, which areas may adopt the shape of holes, filled with gas, in particular with the air or a fluid or a polymer or spaces of another glass with doping allowing to reduce refractive index (further referred to as holes), embedded in a matrix of glass, in particular of silica glass or polymer. The refraction index of the holes is decreased vs. that of the matrix of glass, in (Continued)

Figure 1:
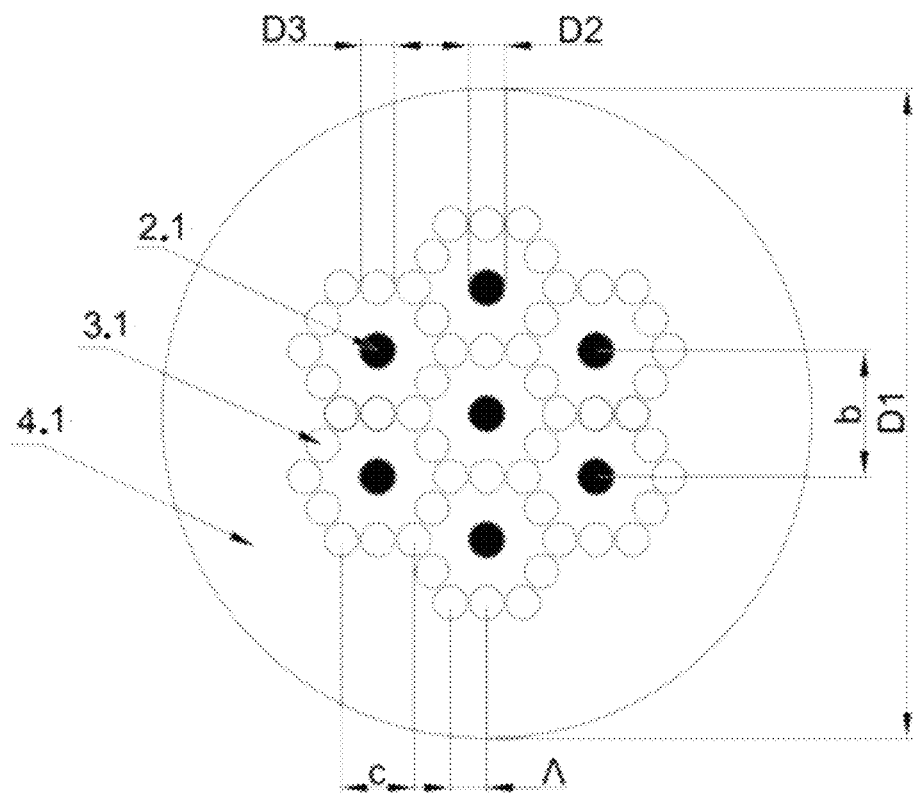

particular of silica glass or polymer. The basic cell is characterised by the diameter of D2 core, the diameter of D3 core and the distance between adjacent holes, corresponding to lattice constant A. The centres of the holes are localised on the vertices and the middle points of the sides of the hexagon, the centre of which is designated by the core; the length of side c of the hexagon, created by the centres of holes, is equal to the preferably doubled lattice constant A. The juxtaposed, at least, two basic cells are surrounded by the cladding, preferably made of glass, in particular of silica glass or polymer. A Device for addressing cores of the multicore optical fibre a fabrication method of the device for addressing cores is also disclosed.

27 Claims, 7 Drawing Sheets

(52) U.S. Cl.
CPC ..... *G02B 6/02357* (2013.01); *G02B 6/02366* (2013.01); *H01S 3/1608* (2013.01)

(58) Field of Classification Search
USPC .......................................................... 385/126
See application file for complete search history.

(56) References Cited

U.S. PATENT DOCUMENTS

| | | | |
|---|---|---|---|
| 2013/0016949 A1* | 1/2013 | Yao | G02B 6/02042 385/126 |
| 2014/0107630 A1* | 4/2014 | Yeik | A61F 9/008 606/5 |

* cited by examiner

14)

MICROSTRUCTURED MULTICORE OPTICAL FIBRE (MMOF), A DEVICE AND THE FABRICATION METHOD OF A DEVICE FOR INDEPENDENT ADDRESSING OF THE CORES OF MICROSTRUCTURED MULTICORE OPTICAL FIBRE

The subject of the invention is microstructured multicore optical fibre (MMOF), and the fabrication method of a device for independent addressing of the cores of microstructured multicore optical fibre.

The introduction of optical fibres to telecommunication systems has brought about a considerable increase in the effectiveness of information transfer. Because of the rapid growth of demand for ultra high capacity level of transmission channels, amounting to 10 Tbit/s per one optical fibre, a kind of breakthrough seems necessary to replace traditional, currently used single mode optical fibres. The to-date's techniques of multiplexing e.g. in the domains of time, wavelength, polarisation and other are simply unsatisfactory to meet the exponential increase of the needs for transmission band. A solution is brought by the space-division multiplexing (SDM) technique, using multicore optical fibres. SDM has been implemented in multicore optical fibres with separated cores, used as separate transmission channels. One of SDM types is mode-division multiplexing (MDM), i.e., the application of optical fibre structure with coupled cores, in which multimode propagation occurs and where each mode represents a separate transmission channel. Nevertheless, unknown remain effective techniques of addressing modes in case of mode-division multiplexing.

The space-division multiplexing techniques may be used together with other techniques of multiplexing, e.g., Wavelength Division Multiplexing (WDM), the Frequency Division Multiplexing (FDM) and other techniques, what leads to still further capacity increase.

The basic requirement for transmission with the use of multicore optical fibres and SDM is a limitation of crosstalks between cores—the users of one transmission channel must not feel the presence of other users, sharing the transmission medium. Other requirements towards commercially cost-effective transmission with the use of SDM is a design of such optical fibre, the parameters of which are in conformity with the actual transmission systems. Such parameters include: geometrical dimensions of optical fibre (a possibility to achieve the same core diameter and/or optical multicore fibre diameter as that of standard, single-mode optical fibre), dispersion (including dispersion zero wavelength (ZDW) and dispersion slope in ZDW), transmission losses, bending losses, polarisation dependent losses, cut-off wavelength and nonlinearity. It is also necessary to ensure an acceptable level of crosstalks at bending and dispersion at bending.

In order to reduce crosstalks, the cores in multicore optical fibre have to be properly insulated. A few approaches to core insulation and, in effect, to crosstalk reduction have already been known, including: decreased the overlap of the adjacent modes by increasing the space between cores, the fabrication of heterogeneous cores with modified refraction indices or diameters and the use of structure with a changed refraction index profile around cores. Combinations of the three above-mentioned approaches are also possible. The increase of space between cores necessitates wide spreading of the cores to achieve the acceptable crosstalk level; thus, it precludes high density of channels in such a fibre. The concept of heterogeneous cores has originated from the observation that if cores of a multicore optical fibre have not very different indices of refraction or diameters, then the crosstalk levels between such cores considerably diminish. The designs of such optical fibres require then a thorough analysis of the minimal number of various cores which will ensure the satisfactory crosstalk level and channel density. In case of the two above-mentioned methods—spreading of cores and the use of heterogeneous cores—there is a problem of high bending losses, as well as higher crosstalk levels at bendings. The application of structure with modified refraction index around the core (trench-assisted fibres) provides partial reduction of the problems with bending losses, crosstalks at bendings and, in general, reduces crosstalk levels.

Another aspect in designing transmission systems with the use of SDM is the necessity to develop a method of connecting the cores of multicore optical fibre with standard, single-mode optical fibre in order to integrate the multicore optical fibre with the actual systems, including the possibility of signal input/output to/from particular cores. Further on, it should be attempted to make use of as many as possible of the already existing elements and technologies in the planned transmission system, making the process of implementation of these new transmission systems as cost-effective and not spread over time as possible.

The structures with trench-assisted fibres have been known from the literature—among others, from the article "Reduction of Crosstalk by Trench-Assisted Multi-Core Fiber" OSA/OFC/NFOEC 2011. Core insulation was achieved by the application of a layer with reduced refraction index around the cores, while additionally, in order to reduce crosstalk levels, heterogeneous cores are also used.

In turn, in the article "Multi-Core Hole-Assisted Fibers for High Core Density Space Division Multiplexing" from the Conference on Optoelectronics and telecommunications—OECC 2010, an optical fibre is presented, in which the cores are insulated by means of six air holes around each core. However, the insulation is not satisfactory in this case to reduce crosstalks without considerable spreading of cores. In order to achieve the beat length at the level above 1 km in the proposed solution, it is not possible to obtain a single-mode operation of the optical fibre at the network constant (the distances between the centres of adjacent holes) below 10 μm, while the cores have then to be spread to a distance equal to the quadruple of the lattice constant. Optical fibres of this type are called "hole-assisted fibres". In the classical, microstructured optical fibres, air holes actively participate in light propagation, and the effect of propagation is guaranteed just because of their presence which causes light entrapment within the core. In optical fibres of the "hole-assisted" type, the applied microstructure has mainly to insulate the cores from one another in such a way a to prevent crosstalks among them. As a rule, in the "hole-assisted" fibres, a doped core is applied at the centre of the microstructure, allowing for light propagation by the same principle as in standard, single-mode optical fibres, however, with one advantage that the holes reduce crosstalks between cores but do not significantly participate in the mechanism of propagation.

From the description of US 2013/0209106 patent, a system of optical transmission is known, multicore optical fibre and the fabrication method of this fibre. In the system of transmission, according to the application for the invention, a series of wavelengths is simultaneously introduced into the adjacent cores of multicore optical fibre, thus a system of spatial multiplexing is used, simultaneously with the wavelength division multiplexing system. Cores in the optical fibre are surrounded by two rings of holes. In case of an optical fibre in version with fixed core (classical microstructured optical fibre), light propagation within the core is guaranteed by the presence of air holes. In another variant, presented in the description of this solution, in which, at the central are, there is also a hole, a propagation mechanism occurs, associated with the existence of a photonic band gap. In the optical fibre, according to that description, it is not planned to give up the ring of holes, closest to the core.

In turn, the description of invention No. US2013064543 discloses a design of the optical fibre in which the cladding has got many holes, fabricated in the nodes of the hexagonal lattice. The optical fibre according to the invention is characterised by bending losses below 5 dB/m with the bending radius of 20 mm. The optical fibre according to the invention is a microstructured optical fibre, in which the structure of holes ensures light propagation. In order to achieve high coupling value, it is necessary to apply a significant number of air layers between cores, what reduces the achieved number of channels. A configuration of optical fibre orientation has also been disclosed in the description; in that configuration, a shift of one core was applied. Such a configuration precludes the participation of this (shifted) core in propagation. In the transmission system, according the discusses description, it is necessary to apply an additional element, generating stress, resulting from bending, transverse stress or both types of stress together in order to suppress the interferences between the cores.

In turn, the US 20110279888 patent description discloses also the method of pumping with the use of a tapered optical fibre coupler, in which frontal pumping is used and in such a way that one of the optical fibres from the fibre bundle, connected with the multicore optical fibre, is replaced by an optical fibre which delivers signal from the pump. A system of data transmission, according to EP 2336813, has also been disclosed, in which the coupling among the cores of a multicore optical fibre is used for data transmission supported by modes' coupling, while the cores are not insulated.

A multicore optical fibre and the layout of cores, according to EP 2610656, has also been disclosed, in which configuration, a multicore fibre contains many single cores, located pointwise at nodes of the hexagonal lattice. Whereby, there are, at least, two types of cores with different profiles of the refraction index.

Among the most pressing problems with the SMD using systems, there is the problem with crosstalk reduction between adjacent transmission channels and the issue of achieving as small as possible bending losses, the reduction which would facilitate the installation of optical fibre cables.

Therefore, the goal of this invention was a design of such an optical fibre structure, in which minimal crosstalks could be ensured, while the parameters, such as transmission losses, bending losses, polarisation dependent losses, dispersion, the cut-off wavelength, nonlinearity and geometrical parameters were as close as possible to the parameters of standard single-mode optical fibres. Simultaneously, the goal of this invention was a design of such a structure in which, the parameters, including crosstalks, dispersion, cut-off wavelength, do not change in any unacceptable way at bending points. Additionally, the goal of the invention was a design of a range of compatible solutions, both passive and active, in which, there is amplification and design of the fabrication method of a device for connecting multicore optical fibre, according to the invention, with standard, single-mode optical fibres, which would ensure correct addressing of particular cores in the multicore optical fibre and reception of signals from particular cores. The use of particular elements: multicore optical fibres, passive and active, according to the invention, as well as devices, dedicated to the above-mentioned elements, used to connect the cores of multicore optical fibres with standard, single-mode optical fibres, will be presented in examples below. The goal of the invention was a design of such a structure, which can be fabricated by known and economically justified methods, e.g., the stack-and-draw method. Moreover, the goal of the invention was such a design of the transmission system components which would enable to make use of as many as possible devices, already operated in transmission systems, as well as of disclosed technologies, e.g., EDFA amplifiers and pumping technologies.

The microstructured, multicore optical fibre, the device and the method to construct a device for independent addressing of the cores of a microstructured, multicore optical fibre, ensure significantly higher capacity level and no crosstalks with a simultaneous optimisation of transmission losses and reduction of bending losses, when compared with standard, single-mode optical fibre.

In the multicore optical fibre, according to this invention, spatial signal multiplication is possible by means of the insulated cores. The term "insulated cores" shall be understood as a situation, in which the crosstalks between the cores remain at a minimal, acceptable level. Core insulation is facilitated by the character of the optical fibre microstructure, i.e. such, in which cores in the optical fibre, according to the invention, are separated from one another by spaces with reduced refraction index vs. the refraction index of the cladding, which may demonstrate e.g. the form of holes filled with gas, preferably with the air or a fluid or a polymer or spaces of another glass with doping allowing to reduce refractive index. Moreover, it is possible to use the multicore optical fibre, according to this invention, in non-telecommunication applications, e.g., sensor applications.

The microstructured multicore optical fibre, according to this invention, includes the area of microstructure, in which, at least, two basic cells are embedded, where each of them contains a core, preferably fabricated of glass, specifically including doped silica glass, or of polymer, together with the surrounding it longitudinal areas with lower refraction index vs. that of the cladding, which areas may adopt the shape of holes, filled with gas, preferably with the air or a fluid or a polymer or spaces of another glass with doping allowing to reduce refractive index (further referred to as holes), embedded in a matrix of glass, specifically including silica glass or polymer. The refraction index of the holes is decreased vs. that of the matrix of glass, specifically including silica glass or polymer. The basic cell is characterised by the diameter of D2 core, the diameter of D3 core and the distance between adjacent holes, corresponding to lattice constant $\Lambda$. The centres of the holes are localised on the vertices and the middle points of the sides of the hexagon, the centre of which is designated by the core; the length of side c of the hexagon, created by the centres of holes, is equal to the preferably doubled lattice constant $\Lambda$. The juxtaposed, at least, two basic cells are surrounded by the cladding, preferably fabricated of glass, specifically silica glass or polymer.

The area outside of the core and inside of the surrounding holes is fabricated preferably of glass, specifically silica glass or polymer and makes an internal cladding. The area, fabricated by the holes, constitutes an internal microstructured cladding. The area outside of the internal microstructured claddings of the basic cells is fabricated by the outer claddings, while the area, at which the cores are located, as well as the internal claddings and the internal microstructured claddings, jointly constitute the area of microstructure.

The first basic cell of the structure is preferably located at the geometrical centre of the multicore optical fibre, while the other basic cells adhere to the first basic cell with their sides or vertices. It is beneficial when the other basic cells, mutually juxtaposed, possess common, core surrounding holes.

In case, when the first basic cell is not located at the geometric centre of the multicore optical fibre, it is beneficial if the geometric centre of gravity of the microstructure area is localised at the geometric centre of the multicore optical fibre, according to this invention.

The D1 diameter of the outer cladding of the multicore optical fibre is freely selected, depending on the number of the structure filling basic cells, preferably with maintained 30 µm distance from the outermost hole to the edge of the matrix of silica glass (the edge of the outer cladding).

In case of the structure, in which the basic cell is localised at the geometric centre of the optical fibre, the basic cells, which surround this basic cell, make the, so-called, first ring. The cores of the first ring rest on the vertices of the hexagon, the side b of which is equal to the tripled lattice constant, multiplied by a, where $a=\frac{2}{3}\cdot\sqrt{3}$ in case, when the basic cells have got common sides. In case, when the basic cells share vertices, the cores of the first ring rest on the vertices of the hexagon, the side b of which equals the quadrupled value of the lattice constant.

The subsequent ring of the basic cell cores, is located on the vertices and the middle points of the sides of the hexagon, the side of which equals the six-fold value of the lattice constant, multiplied by a, where $a=\frac{2}{3}\cdot\sqrt{3}$, in case, when the basic cells share sides. In case, when the basic cells share the vertices, the cores of the first ring are placed on the vertices of the hexagon, side d of which equals the 8-fold value of the lattice constant.

For each subsequent ring, multiplier a demonstrates arithmetic growth and, when the number of rings increases, a dimensional increase of the outer cladding of the multicore optical fibre should be considered.

It is beneficial if the difference between the refraction indices of the core material and the cladding (outer and internal) corresponds to the difference between refraction indices in the standard, single-mode optical fibre and preferably amounts to $\Delta = 5.63 \cdot 10^{-3} \pm 2.9 \cdot 10^{-3}$ for light wave length $\lambda = 1550$ nm.

The adoption of the above-mentioned, preferable difference between the refraction indices of the core and the cladding, allows to achieve preferable fibre operations, especially a 7-core fibre, for the lattice constant $\Lambda$ equal to $(7.8\pm3.6)$ µm, fibre core diameters equal to $(0.7\pm0.46)\cdot\Lambda$, the diameters of holes filled with the air, equal to $(0.7\pm0.3)\cdot\Lambda$, and the cladding diameter, equal to $\Lambda*13+(50\pm20)$ µ.

In case of the invention application in the active version, in the course of which, signal amplification occurs, it is beneficial if the core of the optical fibre, preferably fabricated of silica glass, is doped with ions of the rare earths, preferably of erbium, preferably at the level from $3\cdot10^{18}$/cm$^{-3}$ to $120\cdot10^{18}$/cm$^{-3}$, whereby, the difference between the refraction indices of the cores and the cladding amounts preferably to $\Delta = 2.5*10^{-2-2.1\cdot10^{-2}^{+1.6\cdot10^{-2}}}$ for the light wavelength of $\lambda=1550$ nm.

The adoption of the above-mentioned, active version, preferable difference between the refraction indices of the core and the cladding, allows to achieve preferable fibre operations, especially a 7-core fibre for the lattice constant $\Lambda$ equal to $(7.8\pm3.6)$ µm, fibre core diameters equal to $(0.5\pm0.46)\cdot\Lambda$, the diameters of holes filled with the air, equal to $(0.6\pm0.3)\cdot\Lambda$, and the cladding diameter, equal to $\Lambda*13+(50\pm20)$ µm.

In particular, when the cladding diameter may freely be increased. Together with the adoption of another refraction index of the core and the cladding, as well as of another quantity and arrangement of the cores or the hole filling material, the preferable optical fibre operation necessitates modification of the geometric parameters.

In case of the optical fibre application for transmission in the active version, it is beneficial if the optical fibre microstructure is surrounded with an additional area of holes filled with gas, preferably with the air or a fluid or a polymer (further referred to as the holes), making an additional cladding. The additional area of holes (further referred to as the outer microstructured cladding) surrounds the microstructure area. The outer microstructured cladding divides the outer cladding into two areas: the area of the proximal outer cladding, located between the outer microstructured cladding and the outer holes of the microstructure area and the area of the distal outer cladding, located outside of the outer microstructured cladding to the edge of the optical fibre.

The holes, included in the outer microstructured cladding in the optical fibre with an additional cladding, are preferably located on the sides and the vertices of the hexagon or on the circle. Whereby, it is preferable when the diameters of the holes of the outer microstructured cladding are smaller from the lattice constant $\Lambda$. The holes, included in the outer microstructured cladding, reveal preferably the circle shape in their cross-section area and are in a distance of, at least, 30 µm, preferably if in case, when the wholes, which constitute the outer microstructured cladding, are located on the sides and vertices of the hexagon and the distance among the hole centres of the outer microstructured cladding is equal to lattice constant $\Lambda$. It is also preferable if—in case of an optical fibre with an additional cladding, the diameters of the holes, which constitute the internal microstructured cladding, are decreased vs. the lattice constant, preferably by $(20\pm15)\%$.

It is preferable to facilitate optical fibre cleaving, some, preferably the outermost holes of the basic cells in the microstructure, are given up and/or hole sizes are differentiated in a free way. In order to facilitate splicing, it is preferable to use a, so-called, marker in the optical fibre structure, i.e., for example, an additional hole or holes, which do not affect light guidance.

The device, addressing cores of the multicore optical fibre, according to the invention, includes single-core, single-mode optical fibres (further referred to as single-mode optical fibres), enclosed, preferably in parallel configuration, in a glass or polymer capillary. The number of single-mode optical fibres corresponds to the number of cores in the multicore optical fibre. The capillary with single-mode optical fibres is connected from the other side with multicore optical fibre, preferably with the microstructured optical fibre according to the invention. The cross-sections of the optical fibres in the capillary are parallel with the cross-section of the multicore optical fibre.

In case, when not all cores of the microstructured optical fibre, according to this invention, are addressed, the single-mode optical fibres in the capillary may be replaced by glass rods, the diameters of which are equal with the diameters of the single-mode optical fibres. The number of glass rods in the capillary corresponds to the number of cores in the multicore optical fibre, which are not connected with the single-mode optical fibres. In another example of the system fabrication, glass rods provide the filling of the structure of the device for addressing the cores of the multicore optical fibre according to this invention, when the number or layout of the cores of the multi-core optical fibre does not constitute the structure of closed rings around the core of the central multicore optical fibre.

A glass or polymer capillary is fabricated of material susceptible to changes of geometric dimensions under the influence of temperature, associated with longitudinal tension. The length of the capillary is selected appropriately to the possibility of its mounting on the device for pulling with simultaneous heating, preferably at the station of processing/connecting optical fibre elements, based on a filament splicer. It is preferable if the glass capillary is fabricated of silica, undoped glass.

The fabrication method of the device for addressing cores consists in:
1. an analysis of the structure of multicore optical fibre and determination of the number of cores of the multicore optical fibre, the diameter of cores and the distances among them,
2. measurement of the diameters of the cores and of the claddings of single-mode optical fibres, with which the multicore optical fibre is connected, and the scale of tapering of the single-mode optical fibres is determined,
3. removal of the cladding of single-mode optical fibres and cleaning their surface,
4. etching, preferably with hydrofluoric acid, the exposed and cleaned fragments of the single-mode optical fibres, so that after their possible tapering and mutual reassembly, the alignment of the cores of the multicore optical fibre was possible with the cores of the single-mode optical fibre,
5. tapering of single-mode optical fibres, according to the calculated scale of tapering, allowing to achieve the diameters of their cores equal to the dimensions of the diameters of the cores of the multicore optical fibre (provided its preferable),
6. preparation of a capillary by its tapering to the size, allowing for insertion of single-mode optical fibres and glass rods, so that the inserted elements had no freedom of movement or that their movement was limited,
7. laying of single-mode optical fibres and glass rods in the capillary,
8. tapering and clamping of the laid and spliced structure in the capillary by its heating and tensing, while, if it is necessary, the multicore optical fibre is also tapered,
9. cleaving the capillary with the laid and spliced structure under right angle to the axis of the longitudinal capillary, preferably with a cleaver for optical fibres with various outer diameters and internal structures, with a possibility of controlled stretching of the fibre, preferably the capillary surface is polished, together with structure, laid in the capillary,
10. cleaving the multicore optical fibre and preferably polishing its surface,
11. orientation of the capillary vs. the multicore optical fibre, together with the structure, laid and welded in its inside,
12. connection of the multicore optical fibre with the capillary and the structure in its inside by means of any disclosed technology, preferably by splicing.

The etching process is carried out preferably in temperature of 21° C. with the use of hydrofluoric acid in preferably concentration of approximately 40%.

It is preferable if the tapering of the capillary and its internal structure was made in such a way that the capillary with the laid optical fibres clamped on its internal structure.

It is preferable if the diameters of single-mode optical fibres are considerably bigger from the distances among cores of the multicore optical fibre, according to this invention, if the operations of tapering and etching are changed in the sequence of technological operations. Depending on the geometry of connected optical fibres, the stages of etching and/or tapering may be skipped.

It is preferable if in case, when the cores of the multicore optical fibre have got diameters, other than the cores of the single-mode optical fibres, the tapering process is continued to the equalisation of the diameters of the cores of the single-mode optical fibres, laid as internal structure in the capillary, with the diameters of the cores of the multicore optical fibre (unless it is geometrically not feasible), then the unequalised diameters are preferably left, and it is attempted to achieve equal spaces among the cores in connected elements). It is also preferable if, in case when the diameter of the optical fibre, according to this invention, is larger than the diameter of the single-mode optical fibres, connected with it, following their tapering in the capillary, also the optical fibre, according to this invention, is tapered.

The orientation of the multicore optical fibre and of the structure in the capillary is preferably carried out in such a way that light is delivered to one of the cores of the multicore optical fibre, while during splicing, the fabricated, spliced connection is controlled by checking what part of power has been transferred to one of the single-mode optical fibres in the capillary. In another example of the fabrication, light is delivered to one of the single-mode optical fibres in the capillary, while during splicing, it is checked what part of power has been transferred to one of the cores in the multicore optical fibre.

Splicing is carried out with any disclosed glass processor, preferably a glass processing platform. It is preferable if, for multicore optical fibres with outer diameter not larger than 250 μm a filament splicer is used, while for larger diameters, it is preferable if splicing is done on a station for processing/connecting optical fibre elements, based on filament splicer. It is also preferable to carry out the tapering of single-mode optical fibres, capillaries and capillaries with laid and spliced internal structures with filament splicer or with an optical fibre processing/connecting station, based on a filament splicer.

During splicing, depending on the diameter of the multicore optical fibre and the capillary geometry, including its internal structure, power of the heating element of the glass processing platform is selected to the level ensuring durable mechanical connection, with low optical losses. The settings for particular fibre diameters, concerning the filament power level, the splicing time, the delay before splicing, the distance of shifting the optical fibres onto one another and the distances among optical fibres, are experimentally selected before splicing.

In case of short guidance distances, at which there is no need of signal amplification, a microstructured, guidance multicore optical fibre, according to this invention, is placed between two devices for addressing cores, one of which allows to deliver signal with transmitters and standard single-mode optical fibres to particular cores, while the second device allows to receive signals from particular cores and redirect it to receivers via standard single-mode optical fibres.

In case of transmission distance, at which signal amplification is necessary, the transmission system is preferably arranged in the following way. A signal from transmitters is sent via single-mode optical fibres to the device for addressing cores. Then the signal is guided via the microstructured fibre, according to the invention. When a distance is achieved, after which amplification is necessary, also cyclically within one telecommunication line, an amplifying module is installed. After light amplification with the use of the amplifying module, the signal is guided farther on via the microstructured multicore optical fibre according to this invention. Signals from particular cores are directed to single-mode optical fibres with the device for addressing cores. In this way, the signals are delivered to receivers. The amplifying module consists of two addressing devices, out of which, one directs signals from particular cores of the microstructured multicore optical fibre to single-mode optical fibres, while the second, enables delivery of the signal from optical fibres to the cores of the microstructured multicore optical fibre. In that module, on the line of signal guidance via single-mode optical fibres, there is an integrated, optical fibre amplifying element. Such an element may be, for example, a commercially available erbium-doped fiber amplifier (EDFA).

There are also possibilities of amplification with the use of microstructured, active multicore optical fibre, according to the invention, in which an additional cladding has been applied. Whereby, pumping can be carried out as lateral pumping or pumping from the front of the microstructured, active multicore optical fibre, according to the invention. The technologies of lateral and frontal pumping have been disclosed and do not require any modification for the application in this variant of transmission system. The variant of the transmission system with direct pumping is characteristic in that the signal from transmitters is guided via standard, single-mode optical fibres to the device of independent core addressing, according to the invention. The signal is then guided via the microstructured multicore optical fibre, according to the invention. In case of signal transmission over a distance, after which signal amplification is necessary, an amplification module is used (also cyclically within one telecommunication line). In the amplification module, the microstructured multicore optical fibre, according to this invention, is connected with the microstructured, active, multicore optical fibre, according to the invention by means of any disclosed technology. The connection enables pumping of the microstructured, active, multicore optical fibre, according to the invention in the variant with an additional cladding by means of disclosed technologies with the use of pumping optical fibre(s). Then the signal is amplified in the microstructured, active, multicore optical fibre, according to the invention and with the additional cladding. Then the microstructured, active, multicore optical fibre, according to the invention becomes spliced to the microstructured multicore guidance optical fibre, according to the invention. The signal, guided via the optical fibre, according to the invention, is then directed to the device of independent core addressing, after which step, signals from particular cores are transmitted via standard optical fibres to receivers.

Also possible is the fabrication of other transmission systems, using the microstructured, multicore optical fibre, according to the invention as well as the microstructured, active, multicore optical fibre, according to the invention.

Figure 2:
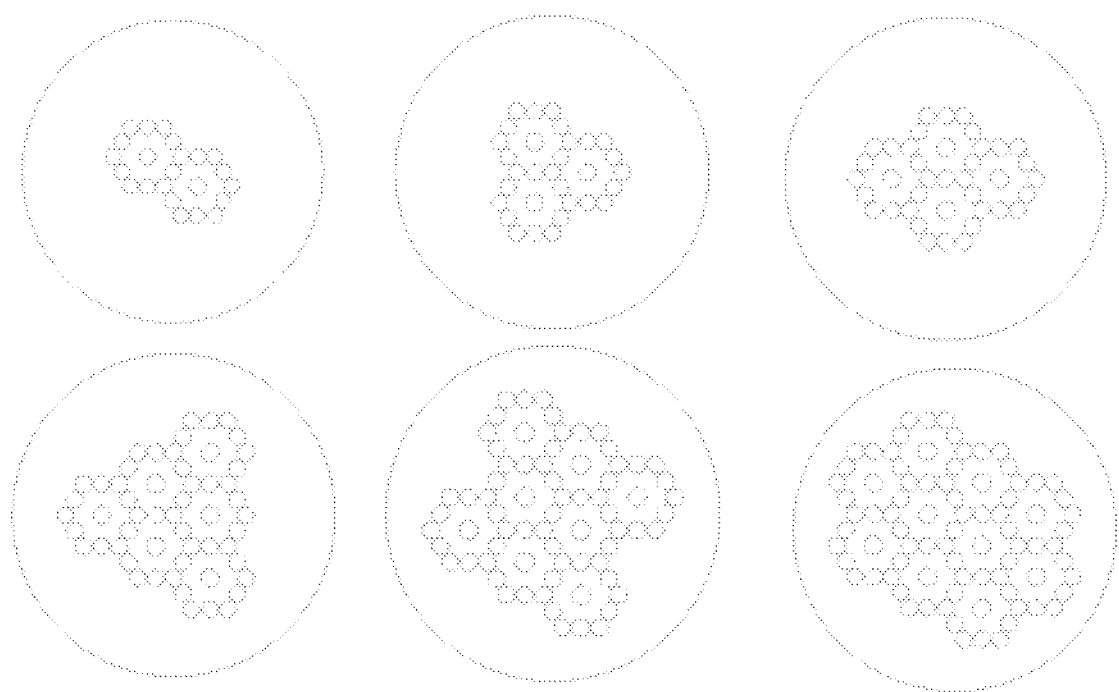
Figure 3:
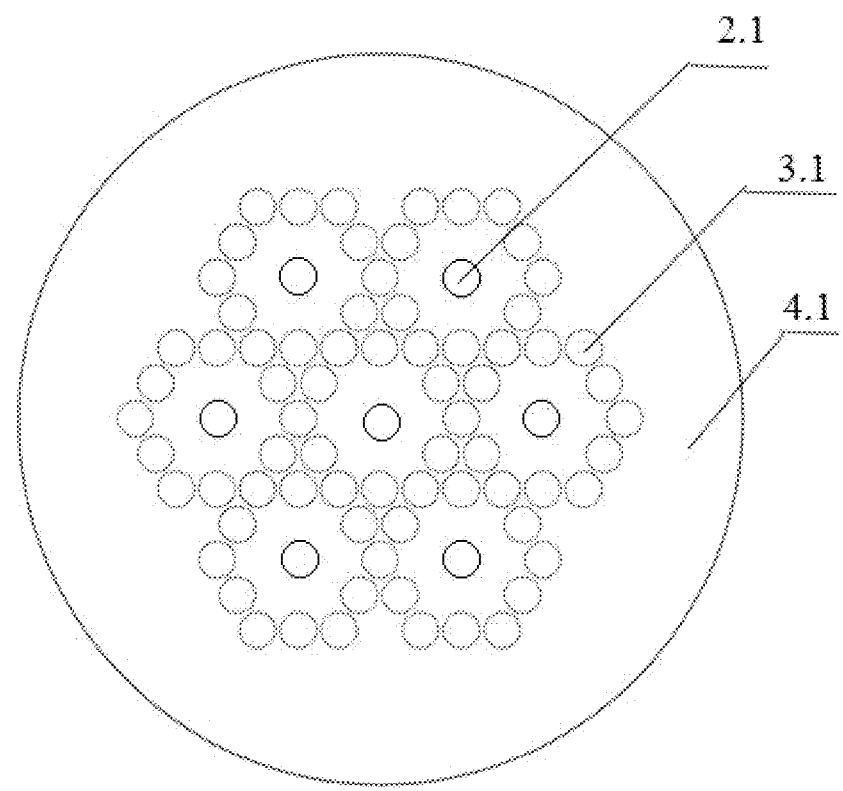
Figure 4:
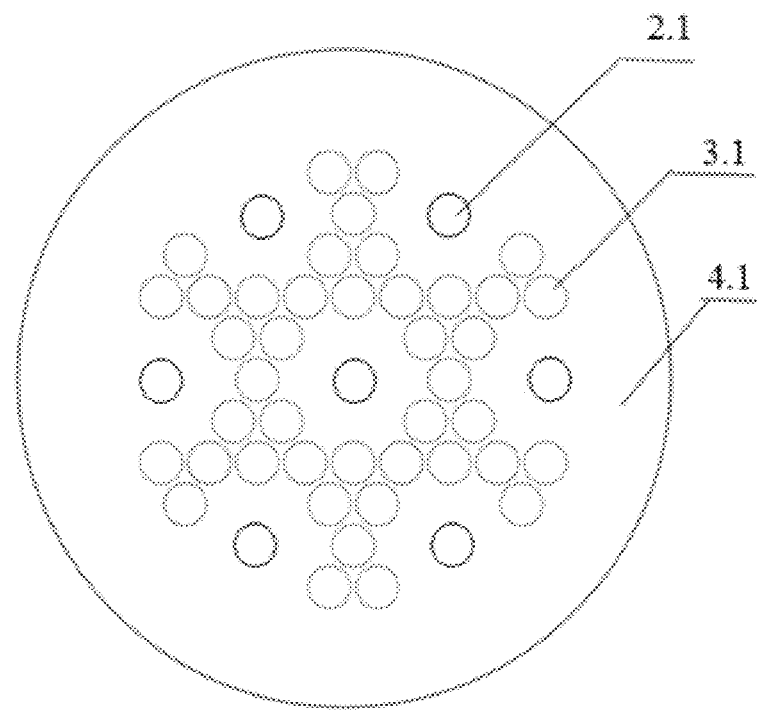
Figure 5:
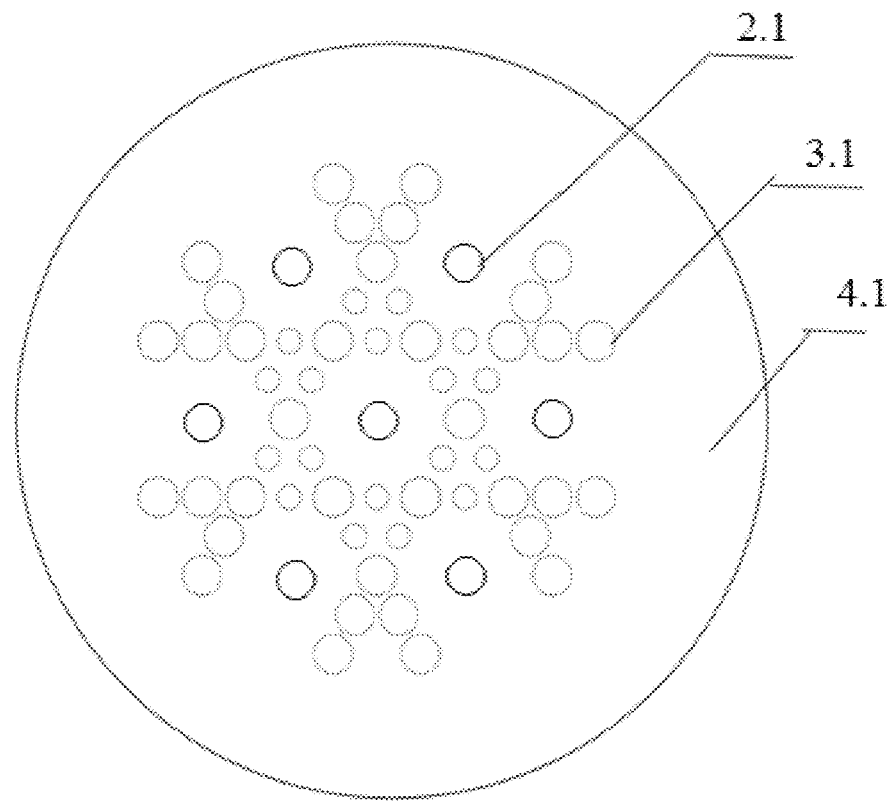
Figure 6:
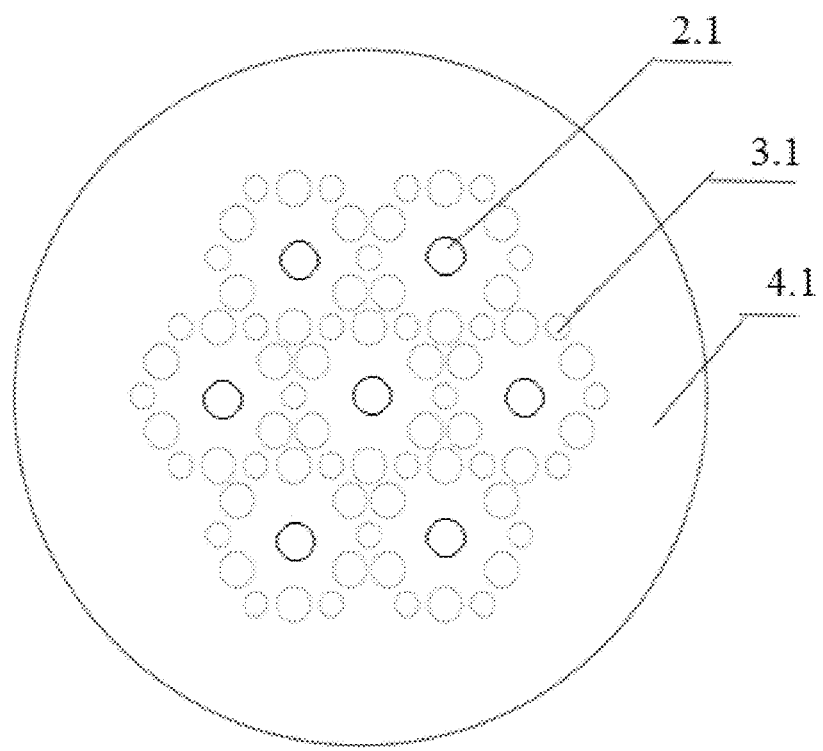
Figure 7:
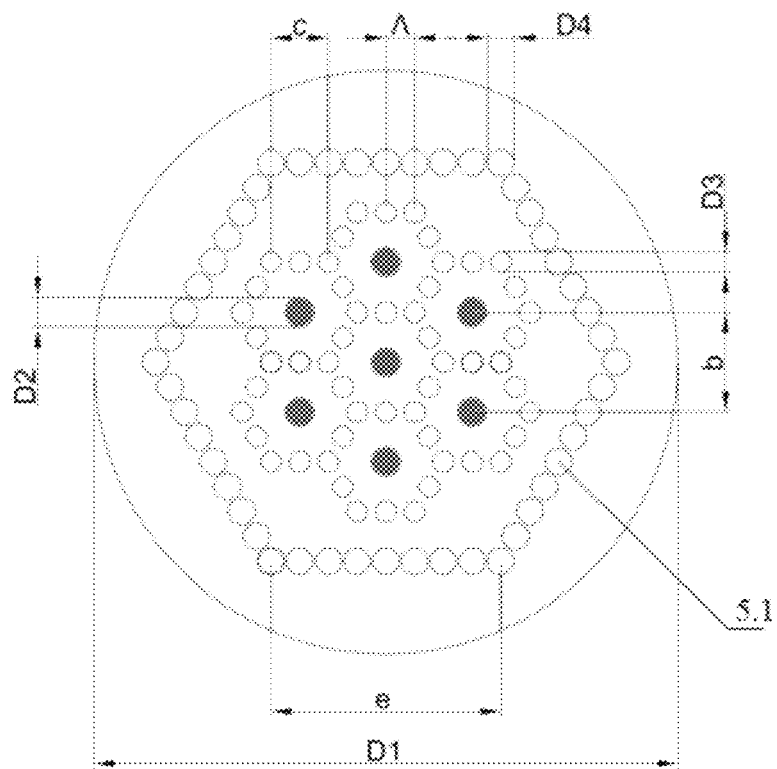
Figure 8:
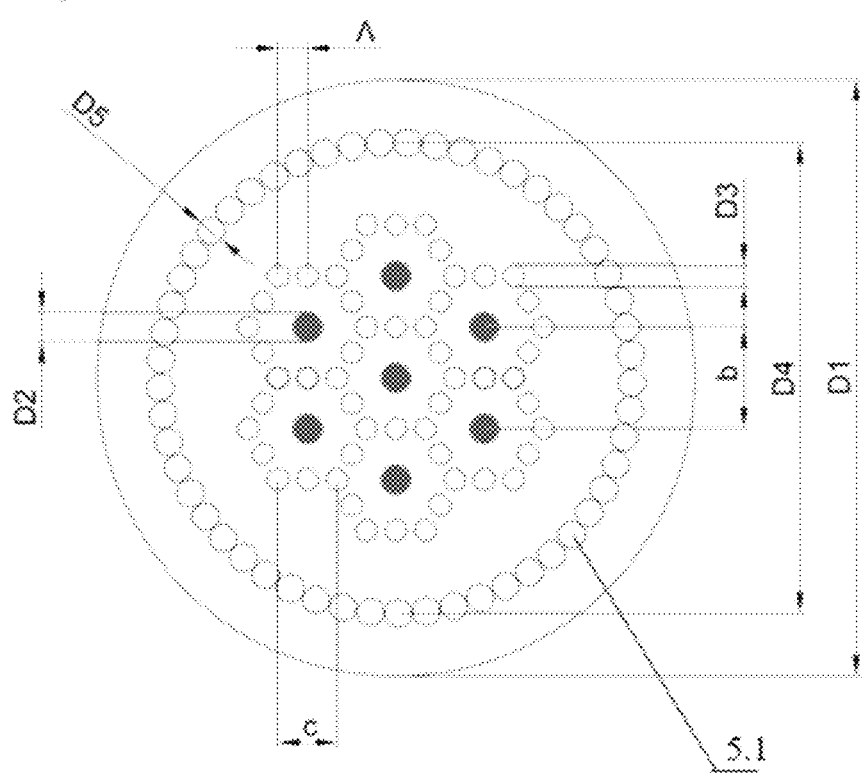
Figure 9:
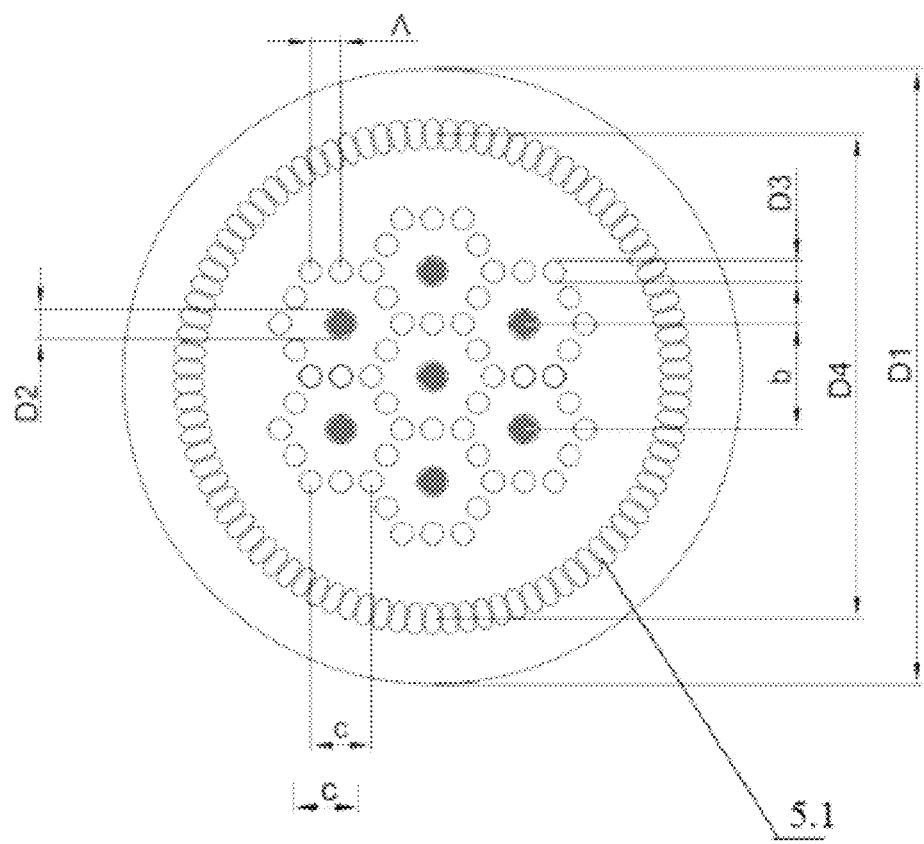
Figure 10:
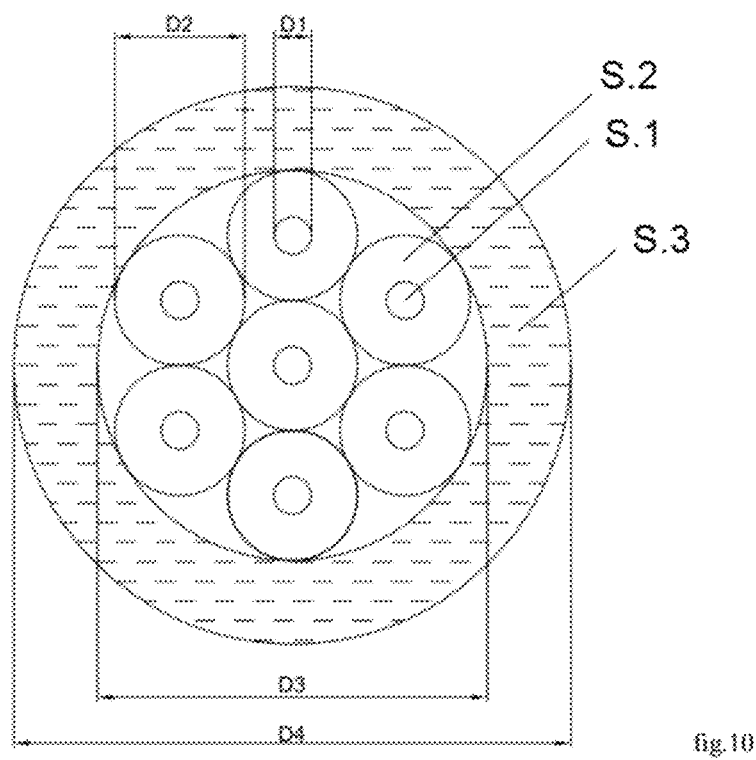
Figure 11:
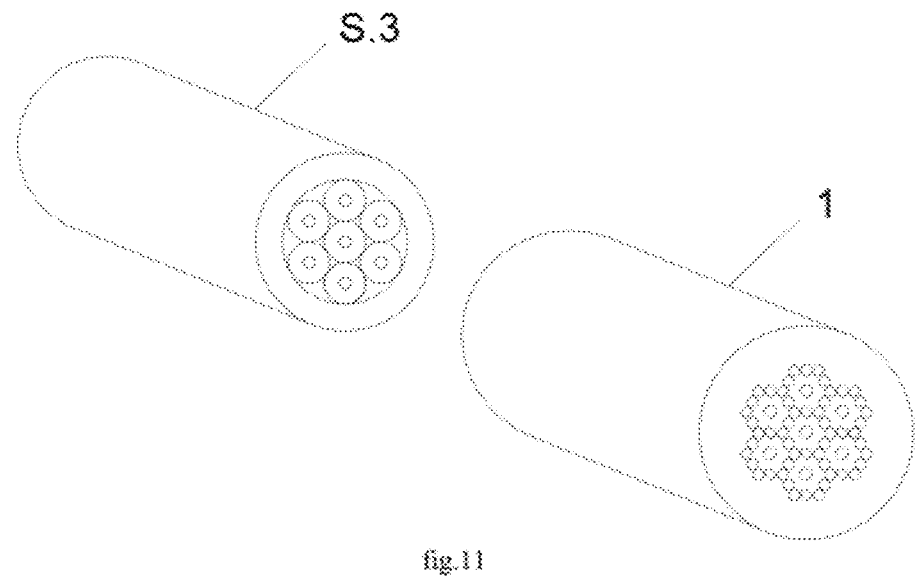
Figure 12:
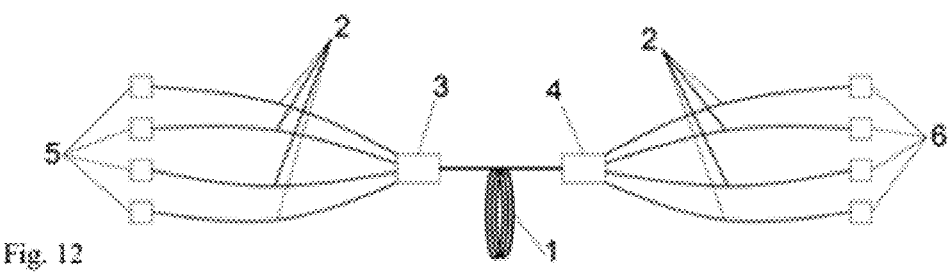
Figure 13:
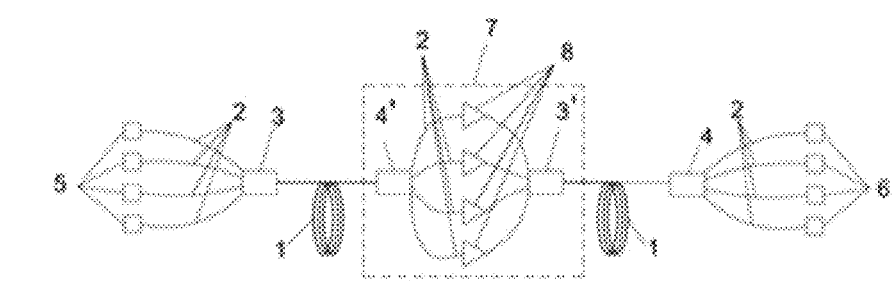
Figure 14:
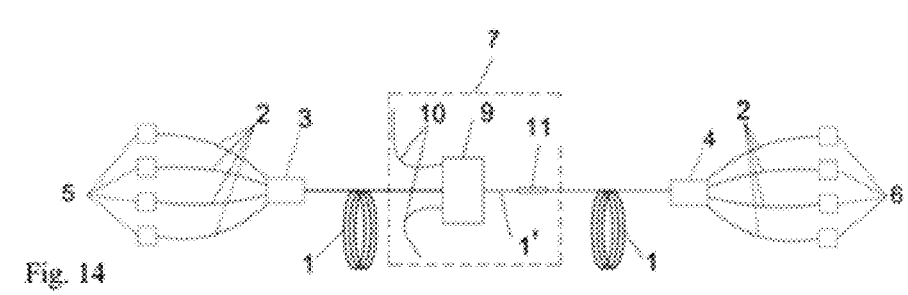
Figure 15:
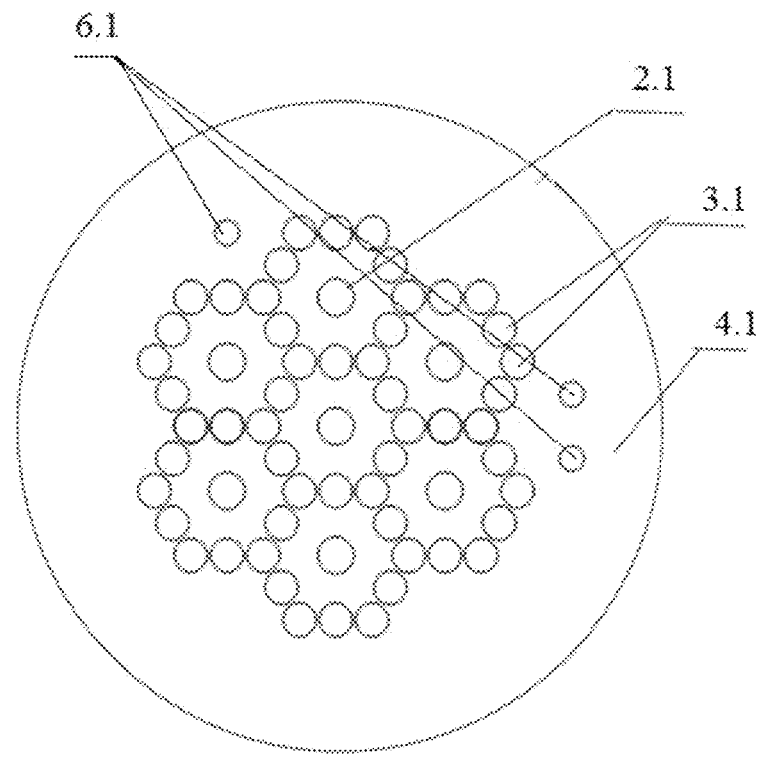
Figure 16:
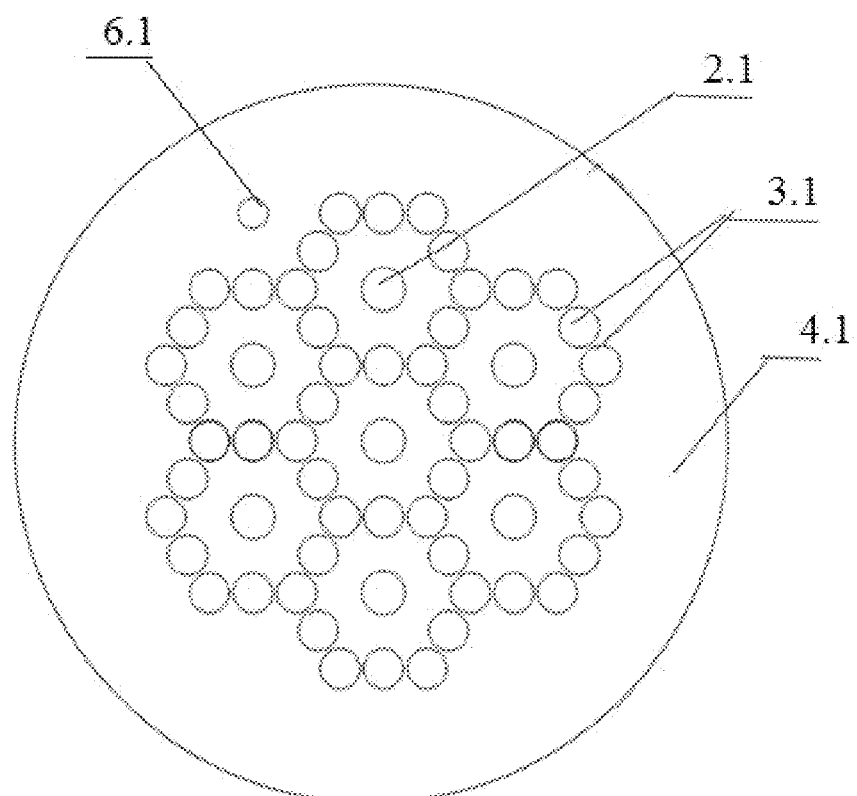

The microstructured optical fibre, according to the invention, has been presented on the drawings, where FIG. 1 presents the cross-section of the optical fibre, according to this invention in a preferable example of fabrication, FIG. 2 presents other, advantageous variants of layout of the basic cells, FIG. 3 presents the cross-section of the optical fibre in another, preferable example of fabrication, FIG. 4 presents the cross-section of the optical fibre in another, preferable example of fabrication FIG. 5 presents the cross-section of the optical fibre in another, preferable example of fabrication, FIG. 6 presents the cross-section of the optical fibre in another, preferable example of fabrication, FIG. 7 presents the optical fibre, according to the invention, with an additional cladding, FIG. 8 presents the optical fibre, according to the invention, with an additional cladding in another configuration of the additional cladding, FIG. 9 presents the optical fibre, according to the invention, with an additional cladding in another configuration of the additional cladding, FIG. 10 presents the cross-section of single-mode optical fibres, located in the capillary, FIG. 11 presents a schematic juxtaposition of multicore optical fibre with the capillary, together with the internal optical fibre structure, FIG. 12 presents a diagram of guidance system with the use of microstructured multicore optical fibre, according to the invention, in a preferable example of fabrication, FIG. 13 presents a diagram of guidance system with the use of microstructured multicore optical fibre, according to the invention, in another preferable example of fabrication, FIG. 14 presents a diagram of guidance system with the use of microstructured multicore optical fibre, according to the invention, in another preferable example of fabrication, FIG. 15 presents the optical fibre, according to the invention, with preferable location of markers (6.1), FIG. 16 presents the optical fibre, according to the invention, with preferable example of fabrication and with another preferable location of marker.

EXAMPLE I

Microstructured, multicore optical fibre, according to invention and intended for transmission, further: microstructured multicore guidance optical fibre, according to the invention, includes an area with microstructure, in which basic cells are embedded, out of which, each of them includes a core of doped silica glass with surrounding it, longitudinal holes, filled with the air, (further: the holes), located in the matrix of silica glass.

The difference between the refraction indices of the core material and the cladding material (both internal and outer) amounts to $\Delta=5.2 \cdot 10^{-3} \pm 0.5 \cdot 10^{-3}$ for the light wavelength of $\lambda=1550$ nm.

The basic cell is characterised by D2 core diameter, D3 hole diameter and the lattice constant $\Lambda$, corresponding to the distance between the centres of adjacent holes. The centres of the holes are located on the vertices and the middle points of the sides of the hexagon, the centre of which is designated by the core; the length of side c of the hexagon, made of the axes of the holes, equals the double value of the lattice constant $\Lambda$. The basic cells, juxtaposed within the microstructure area, are covered with the outer cladding.

The first basic cell of the structure is located at the geometric centre of the multicore optical fibre, while the other basic cells adhere to it with their sides. The other basic cells, mutually juxtaposed, share the core surrounding holes.

The basic cells, surrounding the basic cell, located in the geometric centre of the optical fibre, constitute the, so-called, first ring. The cores of the first ring are located on the vertices of the hexagon, side b of which equals the tripled value of the lattice constant, multiplied by a, where $a=\frac{2}{3}\cdot\sqrt{3}$.

The geometric parameters of optical fibre are determined in the following way:
- D1 outer diameter of the cladding 4.1 is (146.4±5) μm;
- D2 core diameters 2.1 are (8.2±0.5) μm;
- D3 hole diameters 3.1 are (7.7±0.2) μm;
- The lattice constant Λ is (8.2±0.5) μm.

In this example of fabrication, the diameter of the cores of the multicore optical fibre equals approximately the diameter of the core of standard single-mode optical fibre.

The device for addressing cores of microstructured, multicore guidance optical fibre, according to this invention, includes seven standard single-mode optical fibres, enclosed in the capillary and connected via the microstructured multicore optical fibre, according to the invention. The cross-sections of the optical fibres in the capillary are parallel to the cross-section of multicore optical fibre.

The capillary is fabricated of material, susceptible to changes of geometric dimensions under the influence of temperature, combined with longitudinal tension. The capillary is fabricated of undoped silica glass.

The method of fabrication of the device for addressing cores consists in:
1. an analysis of the structure of multicore optical fibre and determination of the number of cores of the multicore optical fibre, the diameter of cores and the distances among them.
2. measurement of the diameters of the cores S.1 and of the claddings of single-mode optical fibres S.2, with which the multicore optical fibre is connected, and the scale of tapering of the single-mode optical fibres is determined.
3. removal of the cladding of single-mode optical fibres and cleaning their surface.
4. etching, preferably with hydrofluoric acid, the exposed and cleaned fragments of the single-mode optical fibres, the alignment of the cores of the multicore optical fibre was possible with the cores of the single-mode optical fibre.
5. tapering of single-mode optical fibres, according to the calculated scale of tapering, allowing to achieve the diameters of their cores equal to the dimensions of the diameters of the cores of the multicore optical fibre.
6. preparation of a capillary S.3 by its tapering to the size, allowing for insertion of single-mode optical fibres and glass rods, so that the inserted elements had no freedom of movement or that their movement was limited
7. laying of single-mode optical fibres and glass rods in the capillary.
8. tapering and clamping of the laid and spliced structure in the capillary by its heating and tensing, while the multicore optical fibre is also tapered.
9. cleaving the capillary with the laid and spliced structure under right angle to the axis of the longitudinal capillary, with a cleaver for optical fibres with various outer diameters and internal structures, with a possibility of controlled stretching of the fibre.
10. cleaving the multicore optical fibre
11. orientation of the capillary vs. the multicore optical fibre, together with the structure, laid and welded in its inside
12. connection of the multicore optical fibre with the capillary and the structure in its inside by splicing.

While connecting the multicore optical fibre with seven cores with standard single-mode optical fibres (7), it is necessary to determine: the number of cores of the multicore optical fibre, core diameter of the multicore optical fibre (8.2 μm), the distance among the cores of the multicore optical fibre (approx. 28 μm). The diameter of the cladding of single-mode optical fibre is determined (approx. 125 μm), as well as the diameter of the cladding of the multicore optical fibre (approx. 146 μm).

Etching is carried out at 21° C. with the use of hydrofluoric acid in 40% concentration. The etching rate at, approximately 63 μm/h, allows to achieve the required diameter of single-mode optical fibre of 28 μm within approximately 46 minutes.

The capillary with initial internal diameter of 200 μm and the outer diameter of 286 μm is tapered to corresponding diameters of 89 μm and 127 μm, respectively.

The etched single-mode optical fibres are laid in the capillary, tapered to 89 μm/127 um, till the moment of laying seven optical fibres in one capillary.

The tapering of the capillary and its internal structure is performed in such a way that the capillary, together with the laid optical fibres, clamped on the internal structure. Accordingly, the capillary is tapered, together with the etched single-mode optical fibres, from the 89/127 μm size down to the 72 μm/103 μm size.

Since during the tapering process of the capillary and its internal, welded structure, the optical fibre cores have also decreased their diameter (down to 7 μm), as well as the distances between cores decreased to 24 μm, the multicore optical fibre should also be tapered. The multicore optical fibre is tapered till the core diameters achieve the value of about 7 μm (i.e., to the cladding diameter of approx. 125 μm).

After the capillary is cleaved, together with the welded in its inside and etched optical fibres, and after cleaving of the tapered multicore optical fibres, the orientation of the multicore fibre and of the structure in the capillary is carried out in such a way that light is delivered to one of the external cores of the multicore optical fibres and, during splicing, is checked what part of power has transferred to one of the single-mode optical fibres in the capillary.

The tapering of single-mode optical fibres, capillaries and capillaries with laid and welded structures, is done by means of a Vytran GPX-3400 filament splicer, used for processing/connecting of optical fibre elements.

During splicing, depending on the diameter of the multicore optical fibre and the geometry of the capillary with its internal structure, the heating power of the glass processing platform is selected, so that the obtained connection was mechanically durable and with low optical losses. The pre-set values of the optical fibre element processing/connecting for the Vytran GPX-3400 glass processing platform are as follows:

| Power [W] | Splicing time [s] | Delay before splicing [s] | Distance of the shifting of optical fibres on one another [μm] | Distance among optical fibres before splicing [μm] |
|---|---|---|---|---|
| 60 | 7 | 0.2 | 14 | 8 |

The way of signal transmission with the use of the microstructured, multicore guidance optical fibre, according to this invention, using the spatial multiplication, is an alternative for the disclosed transmission systems. The method of transmission with the use of multicore optical fibre is such that the microstructured multicore guidance optical fibre, according to this invention, is used as the main guidance medium. The problem of addressing cores in the multicore optical fibre is solved with the use of the device and technique for independent addressing of the cores of the microstructured multicore optical fibre, according to the invention.

In case of small transmission distances (see FIG. 12), over which, no need for amplification occurs, the microstructured multicore guidance optical fibre, according to this invention, 1 is placed between two devices for addressing cores 3 and 4, out of which, one allows to deliver signal by means of transmitters 5 and standard single-mode optical fibres 2 to particular cores, while the second device 4 allows to receive the signal from particular cores and direct it to receivers 6 via standard single-mode optical fibres 2.

When the transmission distance requires signal amplification, it is arranged in the following way (see FIG. 13). The signal from transmitters 5 is guided via single-mode optical fibres 2 to core addressing device 3. Then the signal is guided via microstructured optical fibre, according to the invention 1. On the distance, where amplification is required, an amplification module is installed 7, possible for multiple repetition within one telecommunication line. After light amplification by module 7, the signal is guided farther on via the microstructured multicore guidance optical fibre, according to this invention. Signals from particular cores are directed to single mode optical fibres 2 with the use of the core addressing device 4. In this way, the signals are delivered to receivers 6. The amplifying module 7 consists of two devices for addressing cores 4' and 3, out of which, the first one 4' directs the signal from particular cores of the microstructured multicore optical fibre, according to the invention 1 to single-mode optical fibres 2, while the second one 3' delivers the signal from optical fibres 2 to the cores of the microstructured multicore optical fibre 1. In the amplifying module 7, on the line of signal guidance via single-mode optical fibres 2, there is an integrated, optical fibre amplifying element 8. Such an element 8 may be, for example, a commercially available erbium-doped fiber amplifier (EDFA).

EXAMPLE II

Microstructured, multicore optical fibre, according to invention includes an area with microstructure, in which basic cells are embedded, out of which, each of them includes a core of doped silica glass with surrounding it, longitudinal holes, filled with the air, (further: the holes), located in the matrix of silica glass.

The difference between the refraction indices of the core material and the cladding material (both internal and outer) amounts to $\Delta=5.2 \cdot 10^{-3} \pm 0.5 \cdot 10^{-3}$ for the light wavelength of $\lambda=1550$ nm.

The basic cell is characterised by D2 core diameter, D3 hole diameter and the lattice constant $\Lambda$, corresponding to the distance between the centres of adjacent holes. The centres of the holes are located on the vertices and the middle points of the sides of the hexagon, the center of which is designated by the core; the length of side c of the hexagon, made of the axes of the holes, equals the double value of the lattice constant $\Lambda$. The basic cells, juxtaposed within the microstructure area, are covered with the outer cladding.

The first basic cell of the structure is located at the geometric centre of the multicore optical fibre, while the other basic cells adhere to it with their sides. The other basic cells, mutually juxtaposed, share the core surrounding holes.

The basic cells, surrounding the basic cell, located in the geometric centre of the optical fibre, constitute the, so-called, first ring. The cores of the first ring are located on the vertices of the hexagon, side b of which equals the tripled value of the lattice constant, multiplied by a, where $a=\frac{2}{3}\cdot\sqrt{3}$.

The geometric parameters of optical fibre are determined in the following way:

D1 outer diameter of the cladding 4.1 is (125±5) μm;
D2 core diameters 2.1 are (7±0.5) μm;
D3 hole diameters 3.1 are (6.6±0.2) μm;
The lattice constant $\Lambda$ is (7±0.5) μm In the example of fabrication, the diameter of the cladding of the multicore fibre equals approximately the cladding diameter of standard single-mode optical fibre.

The microstructured active multicore optical fibre, according to the invention, includes an area of microstructure within which basic cells are located, each of them with a core of silica glass, together with the surrounding it twelve longitudinal holes filled with the air, further: the holes, located in the matrix of silica glass. The difference between the refraction indices of the core material and the cladding material (internal and outer) is $2.5 \cdot 10^{-2} \pm 0.5 \cdot 10^{-2}$ for the light wavelength of $\lambda=1550$ nm. Whereby, the core is doped with erbium, at the level from approx. $20 \cdot 10^{18}/\mathrm{cm}^{-3}$ to approx. $100 \cdot 10^{18}/\mathrm{cm}^{-3}$.

The basic cell is characterised by D2 core diameter, D3 hole diameter and the distance between the holes, corresponding to the lattice constant $\Lambda$.

The centres of the holes are localised on the vertices and the middle points of the sides of the hexagon, the centre of which is designated by the core; the length of side c of the hexagon, created by the axes of holes, is equal to the doubled network constant $\Lambda$. The basic cells, located within the area of microstructure, are surrounded by the outer cladding.

The first basic cell of the structure is preferably located at the geometrical centre of the multicore optical fibre, while the other basic cells adhere to the first basic cell with their sides or vertices. The other basic cells, mutually juxtaposed, possess common, core surrounding holes.

The basic cells, surrounding the basic cell, located at the geometric centre of the optical fibre, constitute the, so-called, first ring. The cores of the first ring are located on the vertices of the hexagon, side b of which equals the tripled value of the lattice constant, multiplied by a, where $a=\frac{2}{3}\cdot\sqrt{3}$.

The optical fibre, according to the invention, has got an additional cladding by locating an additional group of holes around the area of the microstructure, made by the basic cells.

The holes, being part of the outer microstructured cladding in the optical fibre with an additional cladding are located on the circle with D4 radius. Whereby, it is preferable D5 hole diameters of the outer microstructured cladding are lower in size from the network constant $\Lambda$. The holes in the outer microstructured cladding demonstrated the circle shape of the their cross-section and are located in a distance from the fibre edge of, at least, 30 μm.

The dimensions of the seven-core optical fibre with an additional cladding are as follows:

D1 outer diameter of the cladding 4.1 is (151±5) μm;
D2 core diameters 2.1 are (2.9±0.5) μm;
D3 hole diameters 3.1 are (5.5±0.5) μm;
The lattice constant $\Lambda$ is (7±0.5)
D4 radius of the additional cladding (90±2) μm;
D5 diameters of the holes 5.1 making the additional cladding (6+0.5) μm.

The device for core addressing of the microstructured multicore optical fibre, according to the invention has got seven, placed in the capillary, standard single-mode optical fibres, connected with the microstructured multicore optical fibre, according to the invention. The cross-sections of the optical fibres in the capillary are parallel with the cross-section of the multicore optical fibre.

The capillary is fabricated of material susceptible to changes of geometric dimensions under the influence of temperature, associated with longitudinal tension. The capillary is fabricated of undoped silica glass.

The method of fabrication the core ad dressing device (the 1-12 sequence of actions) is identical with that in Example I). While connecting the multicore optical fibre with seven cores with standard single-mode optical fibres, the following parameters are defined: 1 the number of cores of the multicore optical fibre (7), core diameter of the multicore optical fibre (7 μm), the distance among the cores of the multicore optical fibre (approx. 24 μm). The diameter of the cladding of single-mode optical fibre is determined (approx. 125 μm), as well as the diameter of the cladding of the multicore optical fibre (approx. 125 μm).

Etching is carried out at 21° C. with the use of hydrofluoric acid in 20% concentration. The etching rate at, approximately 15 μm/h, allows to achieve the required diameter of single-mode optical fibre of 28 μm within approximately 158 minutes.

The capillary with initial internal diameter of 200 μm and the outer diameter of 286 μm is tapered to corresponding diameters of 89 μm and 127 μm, respectively.

The etched single-mode optical fibres are laid in the capillary, tapered to 89 μm/127 um, till the moment of laying seven optical fibres in one capillary The tapering of the capillary and its internal structure is performed in such a way that the capillary, together with the laid optical fibres, clamped on the internal structure. Accordingly, the capillary is tapered, together with the etched single-mode optical fibres, from the 89/127 μm size down to the 72 μm/103 μm size.

After the capillary is cleaved, together with the welded in its inside and etched optical fibres, and after cutting of the tapered multicore optical fibres, the orientation of the multicore fibre and of the structure in the capillary is carried out in such a way that light is delivered to one of the external cores of the multicore optical fibres and, during splicing, is checked what part of power has transferred to one of the single-mode optical fibres in the capillary.

The tapering of single-mode optical fibres, capillaries and capillaries with laid and welded structures, is done by means of a Vytran GPX-3400 filament splicer, used for processing/connecting of optical fibre elements.

During splicing, depending on the diameter of the multicore optical fibre and the geometry of the capillary with its internal structure, the heating power of the glass processing platform is selected, so that the obtained connection was mechanically durable and with low optical losses. The pre-set values of the optical fibre element processing/connecting for the Vytran GPX-3400 filament splicer are as follows:

| Power [W] | Splicing time [s] | Delay before splicing [s] | Distance of the shifting of optical fibres on one another [μm] | Distance among optical fibres before splicing [μm] |
|---|---|---|---|---|
| 58 | 7 | 0.2 | 14 | 8 |

The way of signal transmission with the use of the microstructured, multicore guidance optical fibre, according to this invention, using the spatial multiplication, is an alternative for the disclosed transmission systems. The method of transmission with the use of multicore optical fibre is such that the microstructured multicore guidance optical fibre, according to this invention, is used as the main guidance medium. The problem of addressing cores in the multicore optical fibre is solved with the use of the device and technique for independent addressing of the cores of the microstructured multicore optical fibre, according to the invention.

When the transmission distance requires signal amplification, it is arranged in the following way (see FIG. 14).

During transmission, pumping takes place directly to the microstructured, active, multicore optical fibre, according to the invention in the variant with additional cladding. Whereby, pumping can be carried out as lateral pumping or pumping from the front of the microstructured, active multicore optical fibre, according to the invention in the variant with additional cladding The technologies of lateral and frontal pumping have been disclosed and do not require any modification for the application in this variant of guidance system. The variant of the guidance system with direct pumping is characteristic in that the signal from transmitters 5 is guided via standard, single-mode optical fibres 2 to the device of independent core addressing 3, according to the invention. The signal is then guided via the microstructured multicore optical fibre, according to the invention 1.

In case of signal transmission over a distance, after which signal amplification is necessary, an amplification module 7 is used (also cyclically within one telecommunication line). Within element 9, pumping takes place into the microstructured active multicore optical fibre, according to the invention, in the variant with an additional cladding 1', disclosed technologies with the use of pumping optical fibre(s) 10 and the spliced connection of optical fibre 1' with the transmission optical fibre 1. Specifically, the side from which the active fibre is pumped, is not important for the functional essence of the invention. The signal is amplified in the microstructured, active, multicore optical fibre, according to the invention, in the variant with additional cladding 1'; this optical fibre is connected via the spliced connection 11 with the microstructured, multicore optical fibre, according to the invention 1. The signal, guided via the optical fibre 1 is then directed to the device of independent core addressing, according to the invention 4, after which step, signals from particular cores are transmitted via standard optical fibres 2 to receivers 6.

The invention claimed is:

1. A microstructured, multicore optical fibre, comprising:
a microstructure area in which a plurality of basic cells is embedded, each one of the plurality of basic cells includes a core, the core made of a core material that is glass or doped silica glass or polymer, surrounding each core is a plurality of longitudinal holes having a refractive index that is lower than that of a cladding surrounding the plurality of basic cells and each core of the plurality of basic cells, wherein the plurality of longitudinal holes are filled with air, fluid, polymer, or glass having a doping to reduce the refractive index of the glass, and wherein the plurality of basic cells is located in a matrix of either silica glass or polymer, wherein the refractive index of the filled longitudinal holes is less than a refractive index of the matrix, and wherein each one of the plurality of basic cells is characterized by a diameter of the core, a hole diameter of each of the plurality of longitudinal holes, and a distance between adjacent ones of the plurality of longitudinal holes, corresponding to a lattice constant Λ, wherein centers of the longitudinal holes are located on vertices and middle points of sides of a hexagon having a center which is occupied by one of the cores, wherein the cladding is comprised of silica glass or polymer.

2. The microstructured, multicore optical fibre according to claim 1, wherein a first basic cell of the plurality of basic cells is located at a geometric centre of the microstructured, multicore optical fibre, while the other of the plurality of basic cells adjoins the first basic cell at sides or vertices of the hexagon of the first basic cell.

3. The microstructured, multicore optical fibre according to claim 1 or 2, wherein a length of a side c of the hexagon, is twice the lattice constant Λ.

4. The microstructured, multicore optical fibre according to claim 1, wherein the plurality of basic cells share some of the plurality of longitudinal holes.

5. The microstructured, multicore optical fibre according to claim 1, wherein the plurality of basic cells includes a central basic cell, and wherein others of the plurality of basic cells surround the central basic cell in a first ring, wherein the cores of each of the plurality of basic cells forming the first ring are located in correspondence with vertices of a hexagon and the distance between adjacent basic cells forming the hexagon is three or four times the lattice constant Λ.

6. The microstructured, multicore optical fibre according to claim 5, further comprising a subsequent ring of basic cells around the first ring having cores located at six times the lattice constant Λ apart.

7. The microstructured, multicore optical fibre according to claim 1, wherein a difference between the refractive indices of the core material of each core of the plurality of basic cells and the cladding material is $\Delta = 5.63 \cdot 10^{-3} \pm 2.9 \cdot 10^{-3}$ for light wavelength $\lambda = 1550$ nm.

8. The microstructured, multicore optical fibre according to claim 1, wherein the lattice constant Λ is equal to (7.8±3.6) μm, each fibre core of the plurality of basic cells has the diameter equal to 0.7+/−0.46 that of the lattice constant Λ, the diameters of the longitudinal holes is equal to 0.7+/−0.3 that of the lattice constant Λ, and the cladding diameter is equal to the lattice constant times 13 plus 50 μm+/−20.

9. The microstructured, multicore optical fibre according to claim 1, wherein the core of each of the plurality of basic cells is doped with ions of rare earths.

10. The microstructured, multicore optical fibre according to claim 9, wherein each core is doped with erbium at a level from $3 \cdot 10^{18}/cm^{-3}$ to $120 \cdot 10^{18}/cm^{-3}$, wherein a difference between a refractive index of the cores and a refractive index of the cladding amounts to $$\Delta = 2.5 * 10^{-2} \frac{+1.6 * 10 - 2}{-2.1 * 10 - 2}$$

for light of wavelength of $\lambda = 1550$ nm.

11. The microstructured, multicore optical fibre, according to claim 8 or 9 or 10, wherein the lattice constant Λ is equal to 7.8+/−3.6 μm, a diameter of the cores is equal to 0.5+/−0.46 that of the lattice constant Λ, a diameter of the longitudinal holes is equal to 0.6+/−0.3 that of the lattice constant Λ, and the cladding diameter is equal to the lattice constant Λ multiplied by 13, plus 50 μm+/−20.

12. The microstructured, multicore optical fibre according to claim 9, wherein the plurality of basic cells is surrounded by a ring of additional longitudinal holes.

13. The microstructured, multicore optical fibre, according to claim 12, wherein the ring of additional longitudinal holes forms a hexagon around the plurality of basic cells.

14. The microstructured, multicore optical fibre, according to claim 12, wherein the ring of additional longitudinal holes is arranged in a circle.

15. The microstructured, multicore optical fibre, according to claim 1, wherein the plurality of basic cells includes a central basic cell with the other of the plurality of basic cells surrounding the central basic cell, and wherein the other of the plurality of basic cells are only partially surrounded by longitudinal holes.

16. The microstructured, multicore optical fibre, according to claim 15, wherein the longitudinal holes partially surrounding the other of the plurality of basic cells have varying diameters.

17. The microstructured, multicore optical fibre, according to claim 1, further comprising at least one marker hole outside of the plurality of longitudinal holes that has a refractive index that is different from a refractive index of the plurality of longitudinal holes.

18. A device for addressing cores of a microstructured, multicore optical fibre, comprising a plurality of single-core, single-mode optical fibres, arranged in parallel in a capillary, wherein the number of single-core, single-mode optical fibres is equal to or less than a number of cores in the multistructured, multi-core optical fibre and wherein each one of the single-core, single-mode optical fibres is respectively joined to one of the cores of the multistructured, multi core optical fibre such that a cross section of each of the single-core, single-mode optical fibres in the capillary is parallel with a cross section of the respective core of the microstructured, multi-core optical fibre to which the single-core, single-mode fibre is joined, wherein, the capillary is made of a material that is susceptible to being tapered and changed in dimension upon application of heat and longitudinal tension.

19. A device, according to claim 18, wherein when the number of single-core, single-mode optical fibres is less than the number of cores in the microstructured, multicore optical fibre, the capillary further comprises glass rods in a number equal to a difference between the number of cores in the microstructured, multicore optical fibre and the number of single-core, single-mode optical fibres.

20. A device, according to claim 19, wherein the glass rods act as a filling in the device.

21. A device, according to claim 18, wherein the capillary is made of undoped silica glass.

22. A device, according to claim 18, wherein the capillary is made of polymer.

23. A method of fabrication of a device for independent addressing of the cores of a microstructured, multicore optical fibre, comprising:

analyzing a structure of the microstructured, multicore optical fibre and determining a number of cores of the microstructured, multicore optical fibre, a diameter of each of the cores and or less than for each core, a distance between the core and each other core;

measuring a diameter of a plurality of single-mode optical fibres, including cladding, with which the microstructured, multicore optical fibre is to be connected, and determining a scale of tapering of each one of the plurality of the single-mode optical fibres;

removing the cladding of each of the single-mode optical fibres to expose a fragment and cleaning a surface exposed on each fragment of the single-mode optical fibres created by removing the cladding;

etching, with hydrofluoric acid, the exposed and cleaned fragments of the single-mode optical fibres;

tapering of each of the single-mode optical fibres according to a calculated scale of tapering, so that each one of single-mode fibres is tapered to match the diameter of a respective one of the cores of the microstructured, multicore optical fibre;

tapering a capillary to allow for insertion of the single-mode optical fibres and glass rods, so that the inserted single-mode optical fibres and glass rods have limited freedom of movement;

laying the single-mode optical fibres and glass rods in the capillary;

tapering and clamping the single-mode optical fibres and glass rods in the capillary by heating and tensing;

cleaving the capillary including the single-mode fibres and glass rods at a right angle to a longitudinal axis of the capillary with a cleaver, and polishing a surface of the capillary at a point where it was cleaved;

cleaving the microstructured, multicore optical fibre to create a surface and polishing the surface;

positioning the capillary and the microstructured, multicore optical fibre together and welding the cores of the microstructured, multicore optical fibre to respective ones of the plurality of single-mode cores; and splicing cores of the microstructured, multicore optical fibre with respective ones of the single-mode cores in the capillary.

24. The method of fabrication, according to claim 23, wherein the tapering of the capillary and its internal structure is made in such a way that the capillary with laid optical fibres clamped on the internal structure.

25. The method of fabrication, according to claim 23 or 24, wherein, when the diameters of single-mode optical fibres are substantially larger than the distance among the cores of the microstructured, multicore fibre the tapering and etching are changed in the sequence of technological operations.

26. The method of fabrication, according to claim 23, wherein, when the cores of the microstructured, multicore optical fibre have diameters that differ from the diameters of the cores of single-mode optical fibres, the tapering is continued till equalization of the diameters of the cores of single-mode optical fibres in the structure in the capillary with the diameters of the cores of the multi core optical fibre.

27. The method of fabrication, according to claim 23, wherein positioning the microstructured, multicore optical fibre and the capillary is done in such a way that light is delivered to one of the cores of the multi core optical fibre or to a single-mode optical fibre, while during welding, a connection formed by the welding is checked based on power transfer to one of the single-mode optical fibres in the capillary from the microstructured, multicore optical fibre.

* * * * *